Aug. 7, 1956  I. J. WHITE ET AL  2,757,930
RACE TRACKS

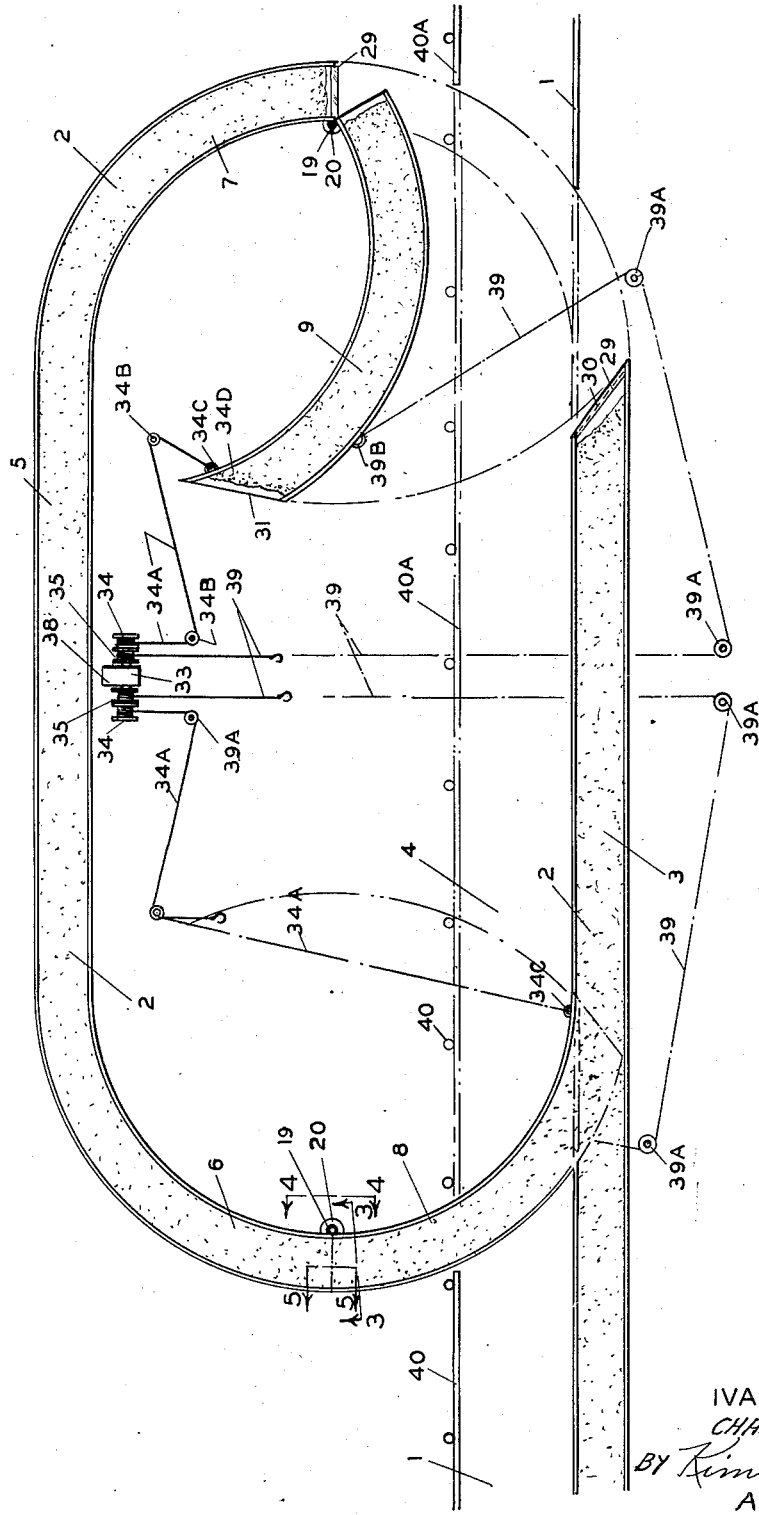

Filed Oct. 30, 1953  3 Sheets-Sheet 2

INVENTORS
IVAN J. WHITE
CHARLES S. HARRIMAN
BY Kimmel + Crowell
ATTORNEYS

Aug. 7, 1956
I. J. WHITE ET AL
2,757,930
RACE TRACKS
Filed Oct. 30, 1953
3 Sheets-Sheet 3
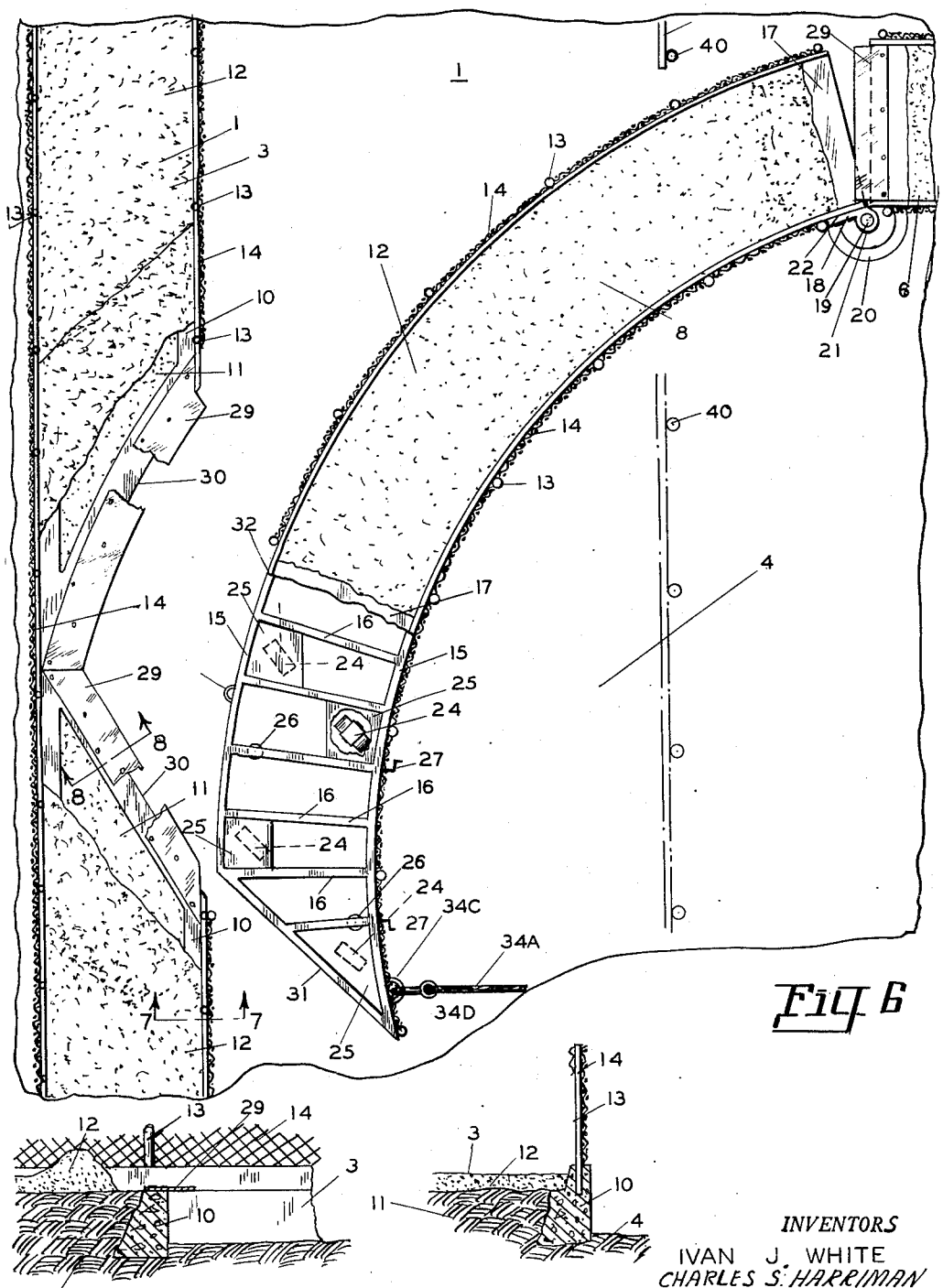
INVENTORS
IVAN J. WHITE
CHARLES S. HARRIMAN
BY Kimmel + Crowell
ATTORNEYS

United States Patent Office 2,757,930
Patented Aug. 7, 1956

2,757,930

RACE TRACKS

Ivan J. White, Portland, Oreg., and Charles S. Harriman, Auburn, Wash.

Application October 30, 1953, Serial No. 389,330

1 Claim. (Cl. 272—5)

Our invention relates to race tracks, and is particularly related to horse and dog tracks.

The primary object of our invention is to combine a dog track with a horse track.

A further object of our invention is to provide simple means of converting from one race track to the other.

In the carrying out of the objects of our invention, the dog track is combined with the horse track by locating the same midway the length of the horse track, one side of the dog track being located on the outer edge of the straight stretch of the horse track, while the inner stretch of the dog track is located within the horse track field.

One of the outstanding features of our invention is the manner in which the dog track crosses over the horse track and how this cross-over is disconnected from the horse track while the horse track is being used and vice versa, how the dog track is completed over the horse track while the dog track is being used.

These and other incidental objects will be apparent in the drawings, specification and claim.

Referring to the drawings:

Figure 1 is a plan view of the dog track disposed within the straight run of the horse track. This view shows one of the dog track cross-overs moved out of the way of the horse track.

Figure 6 is a fragmentary plan view of the dog track cross-over in relation to the horse track. The cross-over is shown partially moved from its racing position.

Figure 7 is a fragmentary sectional view, taken on line 7—7 of Figure 6 through the dog track.

Figure 8 is a fragmentary sectional view, taken on line 8—8 of Figure 6 of the dog track.

Figure 3:
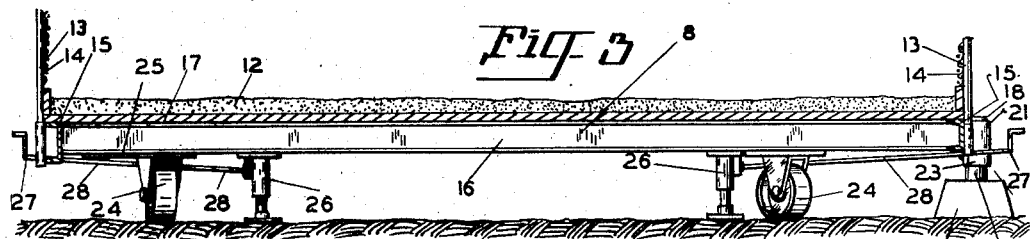
Figure 3 is a sectional view of the movable section of the dog track, taken on line 3—3 of Figure 1.

Referring more specifically to the drawings:

The horse track is indicated by numeral 1, while the dog track is indicated by numeral 2. The dog track is located midway the straightaway of one side of the horse track, usually directly in front of the grandstand. The straightaway 3 of the dog track is located just outside of the straight-away 4 of the horse track, while the straight-away 5 of the dog track is located between the straight-aways of the horse track.

The end turns 6 and 7 of the dog track cross over the straight-away 4 of the horse track. The end turns of the dog track have movable sections 8 and 9. These sections bridge over the horse track 4 and are adapted to connect the straight-away 3 of the dog track with the curved ends 6 of the dog track.

In Figure 1, we illustrate the movable section 8 in racing position for the dog track, while the section 9 is moved to inoperative position for the dog track, bringing the horse track into operating position. The dog track is built up on a higher level than is the horse track, best indicated in Figure 7. This being necessary in order to operate the end movable sections 8 and 9 over the horse track.

The dog track may be constructed in various ways, but in our drawings we illustrate a curb 10, preferably of concrete, filled in between with dirt 11 and a racing turf 12. Completely around the track are fence posts 13, having wire fencing 14 stretched therebetween.

Figure 4:
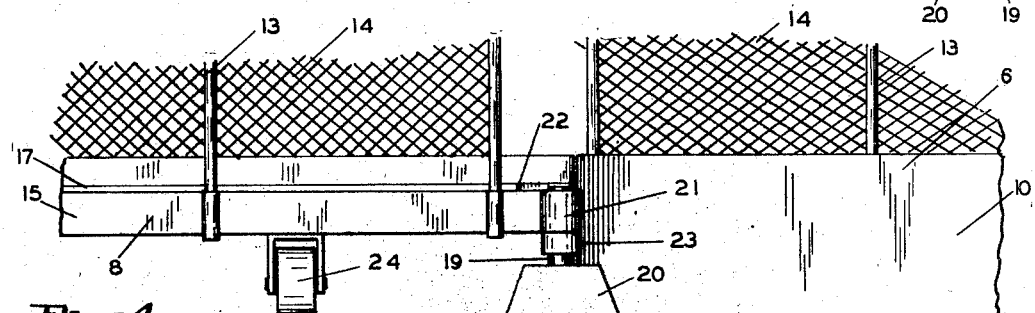
Figure 4 is a fragmentary inside view of the dog track, taken on line 4—4 of Figure 1.

The movable sections 8 and 9 are constructed of longitudinally curved structural steel beams 15, being tied together by transverse structural beams 16, These beams are bridged over by a suitable solid sheet covering 17 upon which the turf sand 12 is spread. The inner ends 18, referring particularly to Figures 1, 4 and 6, are pivotally connected to the stationary curved track 6 by way of the vertical posts 19, which are embedded within footings 20, preferably of concrete by way of the hinge sleeve 21, which is fixedly secured to the inner structural beam 15 at 22. A collar 23 adjusts this sleeve and beam to the proper elevation to the main track sections 6.

Figure 5:
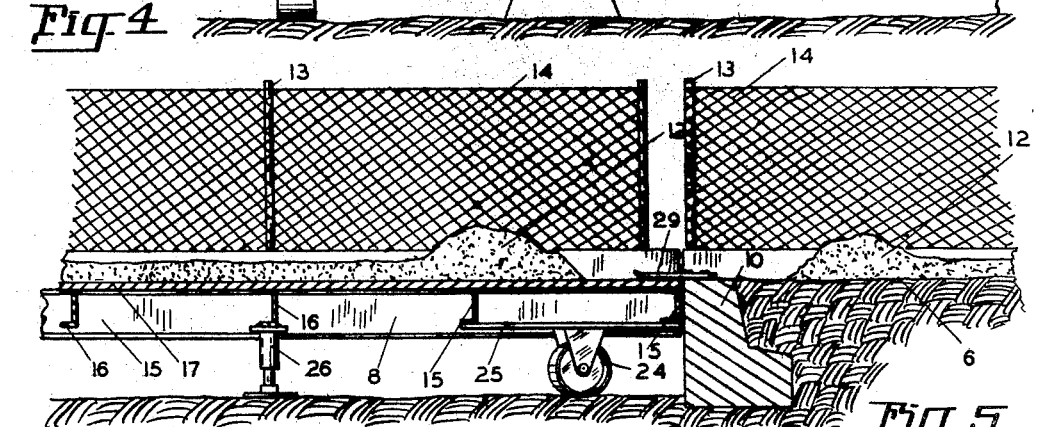
Figure 5 is a fragmentary sectional view, taken on line 5—5 of Figure 1.
Figure 2:
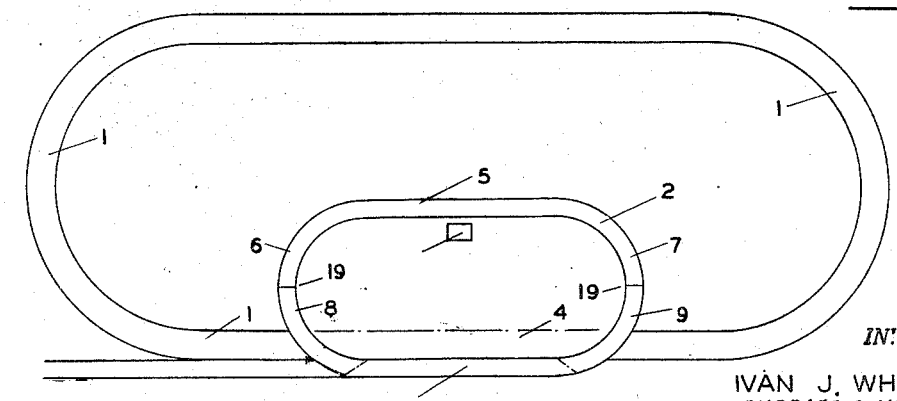
Figure 2 illustrates a diagrammatical view of the dog track in its relation to the entire horse track.

Traction wheels 24 are mounted under the framework 16 by way of the bases 25, which are fixedly secured to the structure as best illustrated in Figures 3, 5 and 6. The center line of these traction wheels is in alignment with the pivot post 19 so that they will travel around the said pivot. These wheels support the weight of the movable sections when they are being moved into and out of position, as well as when they are in position.

Lifting jacks 26 are fixedly secured to the structure beams 16 by any suitable manner. These jacks can be operated along the edge of the sections by the cranks 27, which are secured to the rods 28 which operate the hydraulic pumps associated with the jacks 26. These jacks are used to level the section when in place and to add rigidity to the same.

Referring to Figures 5, 6 and 8, cover plates or lips 29 are affixed to the ends 30 of the stationary portion of the dog track and are adapted to cover the ends 31 and a portion of the side 32 of the movable section while in place. When the sections are in place the turf sand 12 is spread over these lips, making a continuous even track, the lips preventing the same from settling down through the joint.

Referring particularly to Figure 1, a cable drum assembly 33, including the drums 34 and 35, as well as a selective drum operating unit 38 is preferably located along the inner run of the dog track. A cable 34A is trained about the fair-leads 34B and secured to the points 34C of the inner ends 34D of the movable end sections 8 and 9.

Cables 39 are trained about the drums 35 and adapted to be trained about the fair-leads 39A and secured to the points 39B of the movable sections. The cables 34A are adapted to pull the sections 8 and 9 about the pivot post 19 to the position shown by the section 9 in Figure 1, while the cables 39 are adapted to pull the sections 8 and 9 from the position shown by section 9 to the position of section 8.

Removable fence posts 40 are provided for continuing the horse track when the dog track is in inoperative position. These posts support special fence rails 40A that can be removed with the posts while the dog track is in operation.

We will now describe the operation of our new and improved dog and horse track. In the event the dog track is in position and it is desired to move the same out of position so that the horse track can be used, the turf sand 12 is scraped back away from over the lips or plates 39. The cables 34A are connected to the points 34C of the movable sections 8 and 9. The hoisting gear 38 is then brought into operation, revolving the drums 34. This will move the sections to the position shown by section 9 in Figure 6. Both sections can be moved simultaneously or separately. The horse track fence 40 is then erected, having been stored on the field between the tracks.

When the track is converted into the dog track, the fences 40 are removed and the cables 34A are removed from the sections 8 and 9 and the cables 39 are connected to the points 39B and trained about the fair-leads 39A. This will pull the sections 8 and 9 back to the position shown by section 8 in Figure 6. When reaching this position the sections are leveled up and supported by the jacks 26 being adjusted by the hand cranks 27, referring particularly to Figure 3. The turf sand is then spread over the plates or lips 29, completing the dog track. The dog track is then ready for racing by the dogs.

What is claimed is:

In a race course including primary and secondary race tracks positioned in vertically separated planes with portions of said secondary track overlying said primary track when said secondary track is in operative position, means for operatively connecting said secondary track over said primary track comprising a pair of movable bridge sections, hinge sleeves mounted on one corner of each of said bridge sections, vertical pivots mounted on the stationary portions of said secondary track pivotally supporting said hinge sleeves, vertically adjustable collars mounted on said vertical pivots beneath said hinge sleeves to control the height of said hinge sleeves on said pivots, ground engaging wheels mounted under said bridge at the ends opposite to said hinge sleeves, vertically adjustable means carried by said bridge section and engageable with said primary track whereby said bridge sections may be leveled with the stationary portions of said secondary track when said bridge section is in operative position, and means for moving said bridge section into and out of operative position.

References Cited in the file of this patent
UNITED STATES PATENTS

| | | |
|---|---|---|
| 1,866,613 | Auryansen | July 12, 1932 |
| 2,650,826 | Alessio | Sept. 1, 1953 |